(12) United States Patent
Kondoh et al.

(10) Patent No.: US 8,095,257 B2
(45) Date of Patent: Jan. 10, 2012

(54) ELECTRONIC CONTROL APPARATUS HAVING SELF-DIAGNOSIS FUNCTION

(75) Inventors: Masayoshi Kondoh, Chiryu (JP); Koukichi Shimizu, Kariya (JP)

(73) Assignee: Denso Corporation, Kariya, Aichi-Pref. (JP)

(*) Notice: Subject to any disclaimer, the term of this patent is extended or adjusted under 35 U.S.C. 154(b) by 991 days.

(21) Appl. No.: 12/068,537

(22) Filed: Feb. 7, 2008

(65) Prior Publication Data

US 2008/0201035 A1    Aug. 21, 2008

(30) Foreign Application Priority Data

Feb. 16, 2007  (JP) .................... 2007-036385

(51) Int. Cl.
*G01M 17/00*  (2006.01)
(52) U.S. Cl. ......................... 701/29; 701/35
(58) Field of Classification Search .......... 701/29, 701/31
See application file for complete search history.

(56) References Cited

U.S. PATENT DOCUMENTS

| | | | | |
|---|---|---|---|---|
| 4,618,954 A * | 10/1986 | Otobe et al. | ................. | 714/47.1 |
| 5,491,631 A   | 2/1996  | Shirane et al. | | |
| 5,590,040 A * | 12/1996 | Abe et al. | ................ | 701/35 |
| 5,696,676 A * | 12/1997 | Takaba | ................. | 701/31 |
| 5,745,864 A * | 4/1998  | Hosoe et al. | ................. | 701/35 |
| 5,826,205 A * | 10/1998 | Koelle et al. | ................. | 701/29 |
| 5,897,596 A * | 4/1999  | Kabune et al. | ................. | 701/29 |
| 5,964,813 A * | 10/1999 | Ishii et al. | ................. | 701/35 |
| 6,243,627 B1 * | 6/2001 | Ozeki | ................. | 701/29 |
| 6,347,267 B1 * | 2/2002 | Murakami | ................. | 701/35 |
| 6,442,458 B2 * | 8/2002 | Kubo et al. | ................. | 701/29 |
| 6,502,021 B2 * | 12/2002 | Wada et al. | ................. | 701/31 |
| 6,553,289 B2 * | 4/2003 | Maki et al. | ................. | 701/29 |
| 6,615,119 B1 * | 9/2003 | Shimizu | ................. | 701/29 |
| 6,738,696 B2 * | 5/2004 | Oi | ................. | 701/29 |
| 6,819,986 B2 * | 11/2004 | Hong et al. | ................. | 701/29 |
| 6,898,494 B2 * | 5/2005 | Nada | ................. | 701/35 |
| 7,890,227 B2 * | 2/2011 | Sayama et al. | ................. | 701/29 |
| 2002/0002430 A1 | 1/2002 | Nada | | |
| 2005/0173515 A1 | 8/2005 | Sawa et al. | | |

(Continued)

FOREIGN PATENT DOCUMENTS

JP    63-088422    4/1988

(Continued)

OTHER PUBLICATIONS

Japanese Office Action dated Jan. 6, 2009 issued in corresponding Japanese Application No. 2007-036385, with English translation.

(Continued)

*Primary Examiner* — Darnell Jayne
*Assistant Examiner* — Steven M. Buc
(74) *Attorney, Agent, or Firm* — Nixon & Vanderhye PC

(57) ABSTRACT

The electronic control apparatus includes a rewritable nonvolatile memory, a first function of performing a monitoring operation to detect abnormalities in each of a first to N-th (N being an integer larger than 2) items, and a second function of, when the first function detects an abnormality in an M-th (M being an integer larger than 1 and not larger than the N), storing an abnormality code indicative of the detected abnormality in the rewritable nonvolatile memory. The second function is configured to store an identification information associated with the M-th item so that the M-th item can be identified from the first to N-th items in the rewritable nonvolatile memory.

10 Claims, 15 Drawing Sheets

U.S. PATENT DOCUMENTS

2007/0083305 A1* 4/2007 Okada et al. .................... 701/29
2008/0237335 A1 10/2008 Sawa

FOREIGN PATENT DOCUMENTS

| | | |
|---|---|---|
| JP | 3-231048 | 10/1991 |
| JP | 5-172703 | 7/1993 |
| JP | 2000-097810 | 4/2000 |
| JP | 2001-317403 | 11/2001 |
| JP | 2002-002419 | 1/2002 |
| JP | 2004-214027 | 7/2004 |
| JP | 2005-059671 | 3/2005 |
| JP | 2005-222336 | 8/2005 |

OTHER PUBLICATIONS

Japanese Office Action dated Jul. 21, 2009, issued in corresponding Japanese Application No. 2007-036385, with English translation.

* cited by examiner

FIG. 2

CODE CONVERSION TABLE

|  | DIAG CODE | INDEX | STATIC ID | RAM ADDRESS |
|---|---|---|---|---|
| DAIG ITEM 1 | P0112 | 0 | 01 | 0x3ff0000 |
| DAIG ITEM 2 | P0116 | 0 | 02 | 0x3ff0004 |
| DAIG ITEM 3 | P0116 | 1 | 03 | 0x3ff0008 |
| DAIG ITEM 4 | P0116 | 2 | 04 | 0x3ff000c |
| DAIG ITEM 5 | P0220 | 0 | 05 | 0x3ff0010 |
| ⋮ | ⋮ | ⋮ | ⋮ | ⋮ |

<EXPLANATION>
  <DIAG-IDENTIFIABLE INFORMATION>
  USE OF INDEX: ADDITION OF INDEX TO DIAG CODE

ASSIGNMENT OF INDEX TO EACH BIT
    EXAMPLES BIT 1: DIAG ITEM 2 (INDEX 0)
            BIT 2: DIAG ITEM 3 (INDEX 1)
            BIT 3: DIAG ITEM 4 (INDEX 2)

P0116+ (bit1 bit2 bit3 ⋯ )

| P0116 | 1 | 0 | 1 | 0 | 0 | 0 | 0 |
|---|---|---|---|---|---|---|---|
| INDEX: | 0 | 1 | 2 | 3 | 4 | 5 | 6 | 7 |

←DAIG ITEMS 2, 4 ARE ABNORMAL

ELECTRONIC CONTROL APPARATUS HAVING SELF-DIAGNOSIS FUNCTION

CROSS-REFERENCE TO RELATED APPLICATION

This application is related to Japanese Patent Application No. 2007-36385 filed on Feb. 16, 2007, the contents of which are hereby incorporated by reference.

BACKGROUND OF THE INVENTION

1. Field of the Invention

The present invention relates to an electronic control apparatus having a self-diagnosis function.

2. Description of Related Art

As described in Japanese Patent No. 3659017, it is known to provide an electronic control apparatus mounted on a vehicle with a self-diagnosis function. The self-diagnosis function is such a function that periodically checks operating states of sensors or the like, lights a warning light upon detecting malfunction to inform a user of the malfunction, and, in response to an external diagnostic device, outputs one of diag codes, that shows a kind of the malfunction to this external diagnostic device. Such diag codes are stored in a RAM included in the electronic control apparatus, the RAM being always supplied with an operating voltage from a battery.

However, the diag codes stored in the RAM may be erased when a command to erase the diag codes is inputted into the electronic control apparatus form the external diagnostic device, or when the operating voltage of the RAM is removed (for example, when the battery is removed).

Accordingly, a regulation requiring such diag codes to be stored in a nonvolatile memory (EEPROM, for example) is scheduled to be issued. This regulation allows to erase, from the nonvolatile memory, diag codes for items each of which has been determined to be normal successively for a plurality of trip periods (which are referred to as "normally recovered items" hereinafter). Here, the trip period means a driving cycle of a vehicle (for example, a period between an on-timing of a ignition switch and the next on-timing of the ignition switch).

Incidentally, some diag codes are commonly used for a plurality of different items. For example, a certain diag code is used to indicate that there is disconnection or short-circuit in a certain sensor, and also to indicate that the output value of this sensor is abnormal. For another example, a certain diag code is used to indicate occurrence of a misfire in common for a plurality of engine cylinders. In this example, although it can be detected that a misfire has occurred, it cannot be detected in which cylinder the misfire has occurred.

Accordingly, in a case where such a diag code is stored in a plurality of different addresses of the nonvolatile memory so as to correspond to a plurality of different items in a one-to-one relation, when one of these items is determined to be a "normally recovered item", it may become impossible to determine which of these diag codes stored in the different addresses may be erased.

SUMMARY OF THE INVENTION

The present invention provides an electronic control apparatus comprising:
a rewritable nonvolatile memory;
a first function of performing a monitoring operation to detect abnormalities in each of a first to N-th (N being an integer larger than 2) items;
and a second function of, when the first function detects an abnormality in an M-th (M being an integer larger than 1 and not larger than the N), storing an abnormality code indicative of the detected abnormality in the rewritable nonvolatile memory;
wherein the second function is configured to store identification information associated with the M-th item so that the M-th item can be identified from the first to N-th items in the rewritable nonvolatile memory.

According to the present invention, it is possible to provide an electronic control apparatus having a configuration in which some diag code is stored in a plurality of different addresses of a nonvolatile memory thereof so as to correspond to a plurality of different items in a one-to-one relation, and capable of determining, when one of these items is determined to have recovered from abnormality, which of these diag codes may be erased.

Other advantages and features of the invention will become apparent from the following description including the drawings and claims.

BRIEF DESCRIPTION OF THE DRAWINGS

In the accompanying drawings:

FIG. 2 is a diagram showing a code conversion table stored in a ROM included in the engine ECU;

PREFERRED EMBODIMENTS OF THE INVENTION

Figure 1:
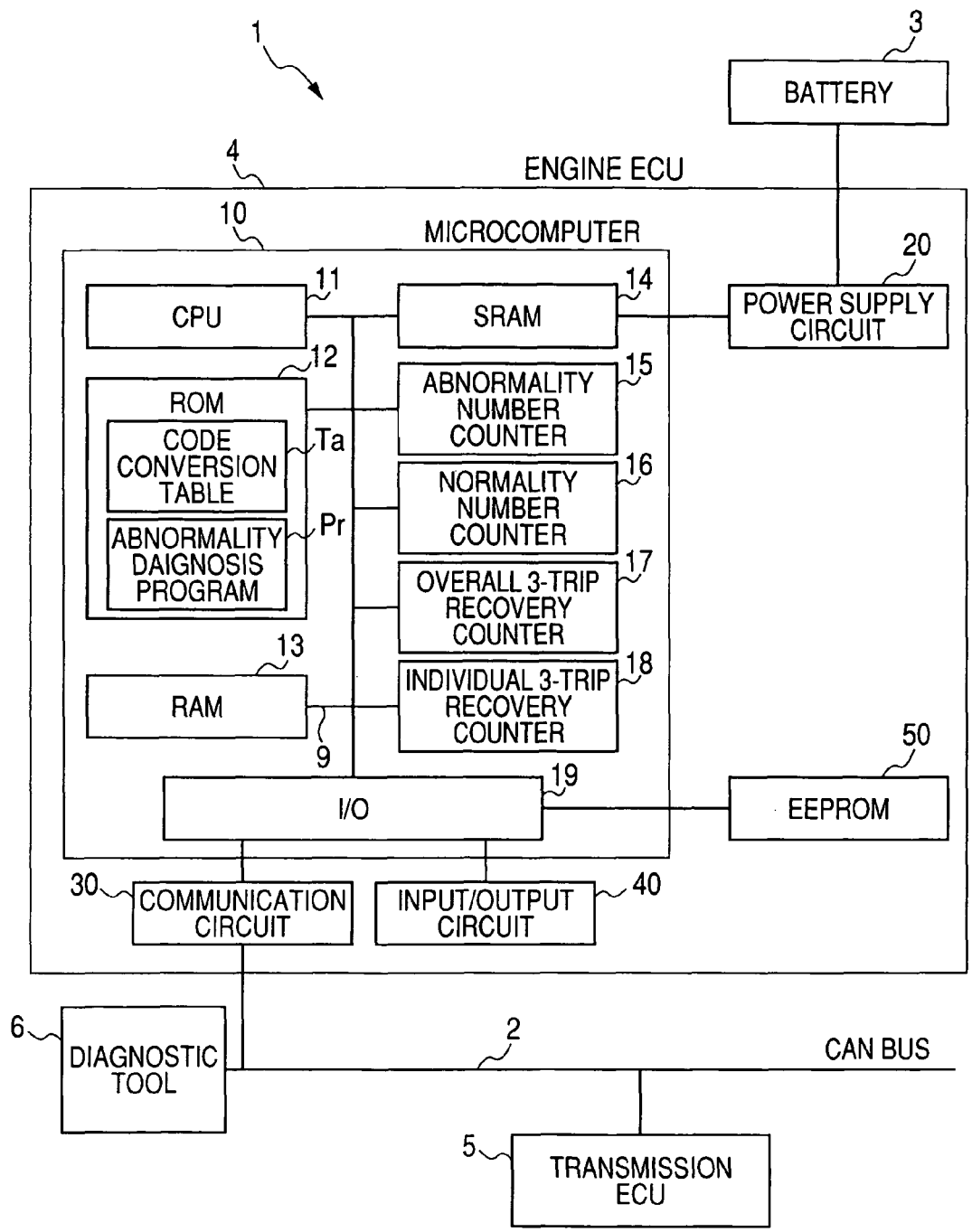
FIG. 1a is a diagram showing an in-vehicle network system including an engine ECU as an electronic control apparatus according to an embodiment of the invention.

FIG. 1 is a diagram showing an in-vehicle network system including an engine ECU 4 as an electronic control apparatus according to an embodiment of the invention.

The engine ECU 4, which operates to control an engine mounted on a vehicle, is communicably connected to a transmission ECU 5 through a CAN (Controller Area Network) bus 2. The transmission ECU 5 operates to control a transmission of the vehicle.

In FIG. 1, the reference numeral 6 denotes a diagnostic tool. The diagnostic tool 6 is brought into connection with the CAN bus 2 at a dealer of the vehicle or a detail shop for the purpose of reading data from the engine ECU 4 or the transmission ECU 5.

The engine ECU 4 and the transmission ECU 5 are powered by a voltage supplied from a battery 3 mounted on the vehicle.

As shown in FIG. 1, the engine ECU 4 includes a microcomputer 10 for controlling the operation of the engine ECU 4, a power supply circuit 20 generating an operating voltage (5 V, for example) to be supplied to the microcomputer 10 and other components of the engine ECU 4, a communication circuit 30 for performing communication with external devices connected to the CAN bus 2 such as the transmission ECU 5 and the diagnostic tool 6, an input/output circuit 40 for receiving signals from various sensors and switches and outputting signals for driving various actuators, and an EEPROM 50 as an nonvolatile memory.

The microcomputer 10 includes a CPU 11 for performing various processes in accordance with predetermined programs, a ROM 12 in which these predetermined programs are stored, a RAM 13 for storing data such as computation results by the CPU 11, a stand-by RAM (referred to as "SRAM" hereinafter) 14, an abnormality number counter 15, a normality number counter 16, an overall 3-trip recovery counter 17, an individual 3-trip recovery counter 18, and an input/output circuit 19 (referred to as "IO 19" hereinafter). These components are connected to one another through a bus 9. The communication circuit 30, input/output circuit 40, and EEPROM 50 are connected to the microcomputer 10 through the I/O 19.

The ROM 12 stores therein a code conversion table Ta, and an abnormality diagnosis program Pr performed by the CPU 11. The details of the code conversion table Ta, and the abnormality diagnosis program Pr are described later. Although the ROM 12 stores therein other various programs, since they are not relevant to the present invention, explanations thereabout are omitted here.

The CPU 11 detects components in an abnormal state (abnormal items) of the vehicle in accordance with the abnormality diagnosis program Pr. The abnormality number counter 15 counts the number of the abnormal items detected by the CPU 11, and the normality number counter 16 counts the number of items which have recovered from the abnormal state to the normal state.

The overall 3-trip recovery counter 17 is set to 3 each time the CPU 11 detects an abnormality (abnormal item), and after that, down-counts by 1 each time the CPU 11 makes a determination of the number of abnormalities≦the number of normalities. The individual 3-trip recovery counter 18 is set to 3 each time the CPU 11 detects an abnormality (abnormal item), and after that, down-counts by 1 each time the CPU 11 makes a determination that the detected abnormal item has recovered to the normal state. The details of these counters are described later.

The microcomputer 10 of the engine ECU 4, which detects any presence of abnormality for a plurality of different items, stores, upon detecting an abnormal item, an abnormality code (referred to as a "diag code" hereinafter) indicative of the type of the abnormality in the SRAM 14. As described in the foregoing, some diag code is commonly used for a plurality of different items. In the following explanation, the item to be detected as to normality/abnormality is referred to as a "diag item".

Upon receiving a diag code read request from the diagnostic tool 6, the engine ECU 4 outputs the diag codes stored in the SRAM 14 at that time to the diagnostic tool 6. The diag codes outputted from the engine ECU 4 to the diagnostic tool 6 are displayed on a not shown display of the diagnostic tool 6. This makes it possible to identify a function or a component which is malfunctioning.

On the other hand, upon receiving a diag code erase command from the diagnostic tool 6, the engine ECU 4 erases the diag codes stored in the SRAM 14. Accordingly, as described in the column of Description of Related Art, a regulation requiring diag codes to be stored in a nonvolatile memory (EEPROM, for example), and requiring to make the information stored in the nonvolatile memory non-erasable under certain conditions is scheduled to be issued.

Here, explanation is made as to the information stored in the EEPROM 50 in this embodiment. FIG. 2 is a diagram showing the code conversion table Ta which is used to generate information to be stored in the EEPROM 50. In the following explanation, the information generated by the code conversion table Ta is referred to as diag-identifiable information. In this embodiment, the EEPROM 50 has four storage areas for storing four kinds of diag-identifiable information. In the following, each of these four storage areas is referred to as a storage area (n), n being 0, 1, 2, or 3.

As shown in FIG. 2, in the code conversion table Ta, each diag code is associated with one or more diag items. For example, the diag code "P0116" is associated with the diag items 2-4.

Also, in the code conversion table Ta, each diag item is associated with an index, a static ID, and a RAM address. The index, static ID, and RAM address are information for uniquely identifying each diag item.

The index is information for distinguishing the diag items associated with the same common diag code from one another. For example, the diag items 2, 3, 4 associated with the same common diag code P0116 are respectively associated with indexes "0", "1", "2". And each of the diag items 1, 5 associated with the different diag codes P0112, P0220 is associated with index "0".

Some diag items associated with different diag codes may have the same index. However, any diag items associated with the same common index do not overlap in their indexes. Accordingly, it is possible to uniquely identify each diag item from its diag code and index.

The static ID is information uniquely assigned to all the diag items. In this embodiment, all the diag items are assigned with consecutive numbers starting from "01" as the static IDs, so that each diag item can be uniquely identified from its static ID.

The RAM address, which is a storage address in the SRAM 14, is information also uniquely assigned to all the diag items. That is, the storage addresses of the diag items are predetermined in advance. Accordingly, it is possible to uniquely identify each diag item from its RAM address.

To generate diag-identifiable information, any of the index, static ID, and RAM address may be used. Or two or all of them may be used. In this embodiment, the index is used as explained below.

As described in "EXPLANATION" in FIG. 2, the diag-identifiable information is a diag code with an index added. In this embodiment, 1-byte (8-bit) data indicative of an index (may be referred to as "index data" hereinafter) is added to data indicative of a diag code.

The first to eighth bits of the index data respectively correspond to the numerical values of 0, 1 . . . , 7 of the indexes. For example, to add index "0" to a diag code, the first bit of the index data is set to "1". In other cases, the first bit of the index data is set to "0".

In this way, it is possible to add any desired index to a diag code by setting, to "1", one of the eight bits of the index data corresponding to the numerical value of this desired index. For example, to generate diag-identifiable information showing that the diag item 2 whose index is "0", and the diag item 4 whose index is "2" are abnormal, the first and third bits of the index data are set to "1", and the other bits are set to "0". The index data may include two or more bytes.

In a similar manner as above, the static ID or RAM address may be added to each diag item to generate the diag-identifiable information.

For example, the diag-identifiable information showing that the diag item 2 is abnormal is "P0116+02" when the static ID is used, and "P0116+0x3ff0004" when the RAM address is used.

Furthermore, the static ID or RAM address may be used as the diag-identifiable information. For example, the static ID used as diag-identifiable information showing that the diag item 2 is abnormal is "02", and the RAM address used as diag-identifiable information showing that the diag item 2 is abnormal is "0x3ff0004".

Figure 3:
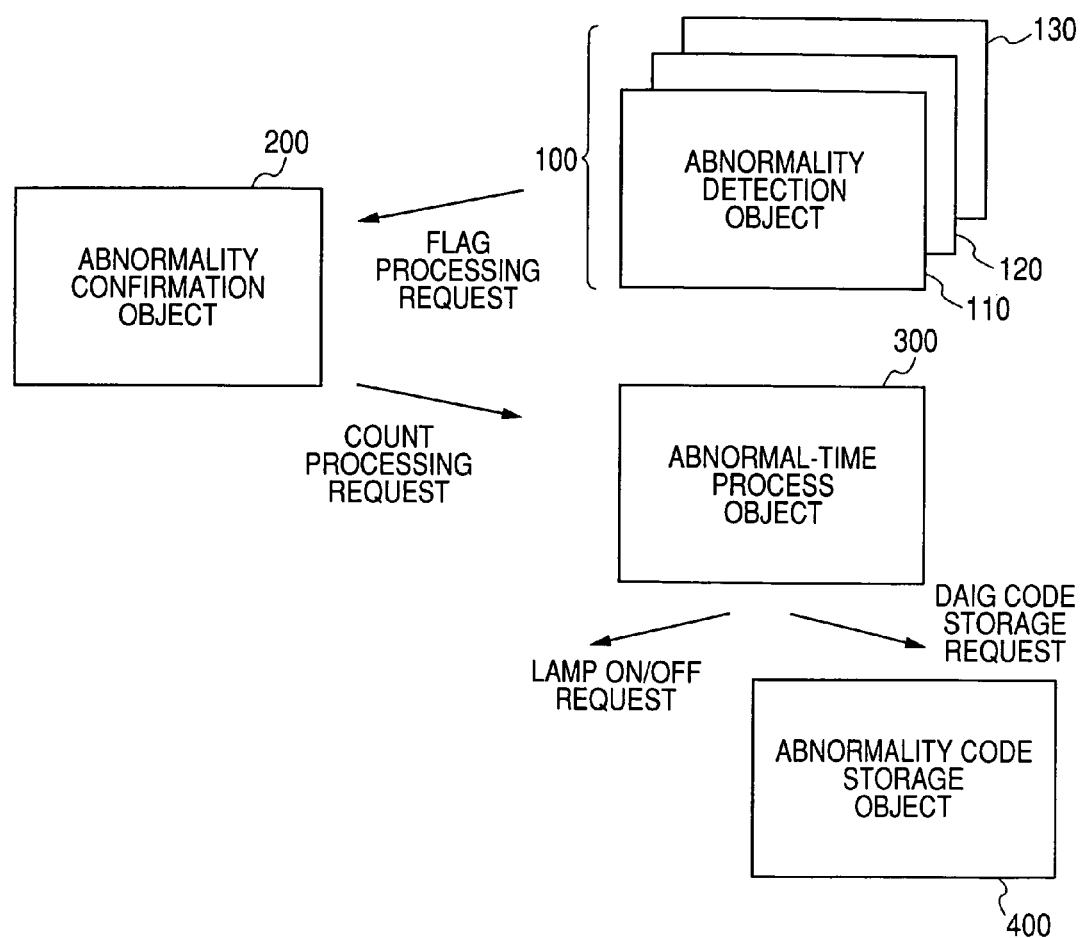
FIG. 3 is a diagram explaining a structure of an abnormality diagnosis program performed by a microcomputer included in the engine ECU.

Next, explanation is made as to the abnormality diagnosis program Pr with reference to FIG. 3 conceptually showing the structure (architecture) thereof. Incidentally, the conception shown in FIG. 3 is disclosed in Japanese Patent No. 3659017 mentioned in the foregoing.

The abnormality diagnosis program Pr is a program by object-oriented design. The object-oriented design is a technique used to describe, in view of the behavior of a system as interaction among a plurality of objects, characteristics of these objects and relationships among these objects. By using interaction to couple the objects by interaction such as a request and a response (referred to as "message" hereinafter), a series of processes can be implemented. The object is described in the form in which data (or attribute), and data-processing procedure (or method) are integrated. The object executes the method upon receiving a request (message) from another object. Requesting the object to execute a task can be made only through the method in this object, and making direct access to the data in this object is inhibited.

As shown in FIG. 3, the abnormality diagnosis program Pr is constituted by an abnormality detection object 100, an abnormality confirmation object 200, an abnormal-time process object 300, and an abnormality code storage object 400.

The abnormality detection object 100 includes a program to make a normal/abnormal determination on the basis of information inputted to the engine ECU 4 from the sensors and switches. This abnormality detection object 100 is objectified for each of the diag items.

For example, if the diag items include a water temperature sensor, an inlet air temperature sensor, and a throttle sensor, the abnormality detection object 100 is configured to include an object 110 to detect an abnormality in the water temperature sensor, an object 120 to detect an abnormality in the inlet air temperature sensor, and an object 130 to detect an abnormality in the throttle sensor. When a new diag code is added, an object corresponding to this new diag code is added. And when one of the diag codes is deleted, an object corresponding to this diag code is deleted.

If the abnormality detection object 100 detects an abnormality, a message of a flag processing request is issued from the abnormality detection object 100 to the abnormality confirmation object 200, a message of a count processing request is issued from the abnormality confirmation object 200 to the abnormal-time process object 300, and a message of a diag code store request is issued from the abnormal-time process object 300 to the abnormality code storage object 400.

The abnormality confirmation object 200 is activated in response to the flag processing request (subroutine call) from the abnormality detection object 100, and implements a process to confirm abnormality/normality, for example.

The abnormal-time process object 300 is activated in response to the count processing request (subroutine call) from the abnormality confirmation object 200, and implements a process to count the number of abnormalities/normalities, for example.

The abnormality code storage object 400 is activated in response to the diag code store request (subroutine call) from the abnormal-time process object 300, and implements a process to store a diag code, for example.

Figure 4:
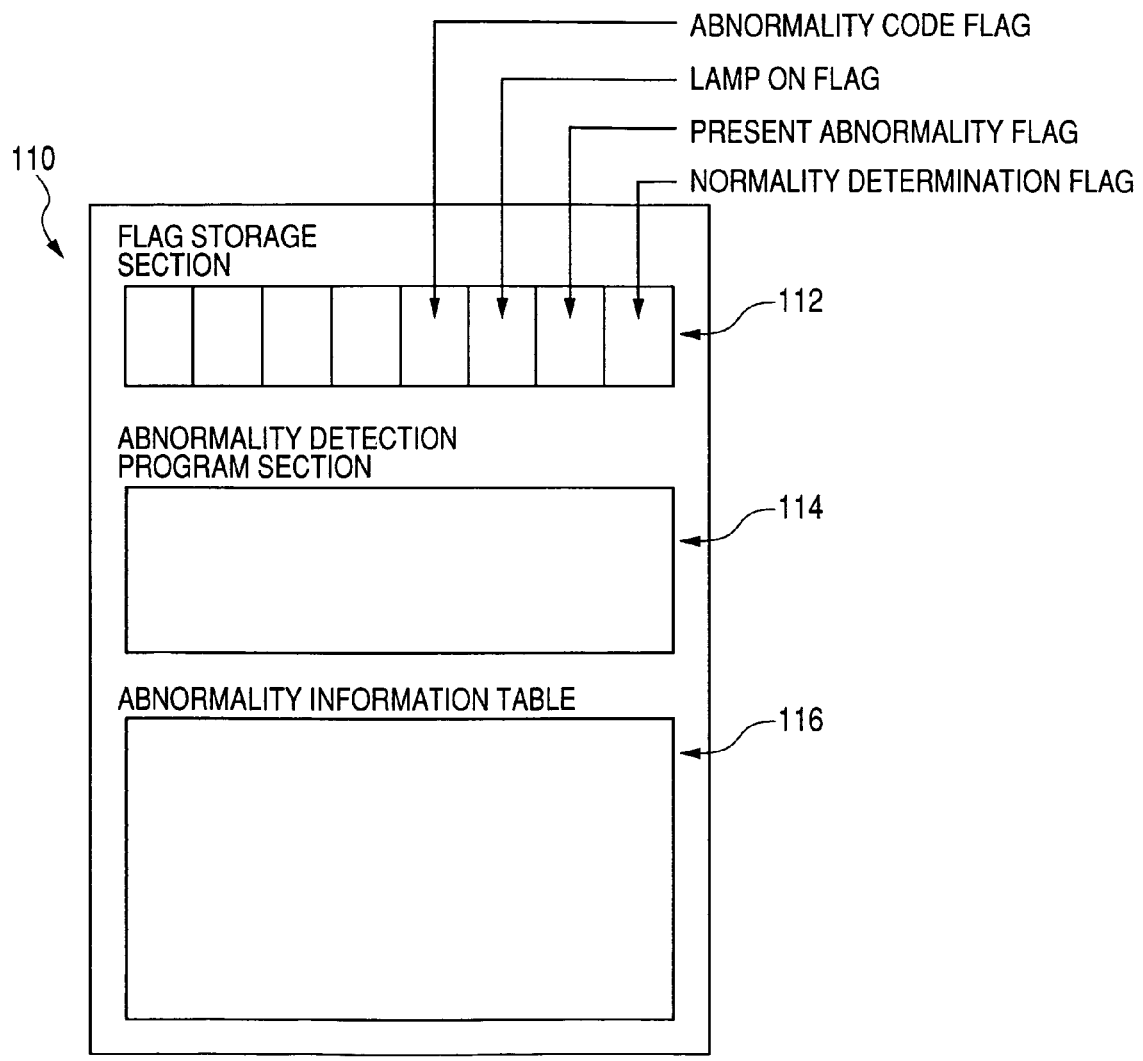
FIG. 4 is a diagram showing a structure of an abnormality detection object included in the abnormality diagnosis program.

FIG. 4 is a diagram showing the detailed structure of the object 110 to detect an abnormality in the water temperature sensor, which is included in the abnormality detection object 100. The objects 120, 130 have the same structures as the object 100.

As shown in FIG. 4, the object 110 is constituted by a flag storage section 112, an abnormality detection program section 114, and an abnormality information table 116. The following is an explanation of the flags stored in the flag storage section 112. The normality determination flag is such as to be set to "1" when a normality determination is made by the abnormality detection program section 114. The present abnormality flag is such as to be set to "1" when an abnormality determination is made by the abnormality detection program section 114. The lamp on flag is such as to be set to "1" when the abnormality determination is confirmed (At this time, a lamp on request is issued). The abnormality code flag is such as to be set to "1" when the abnormality determination is confirmed (At this time, a diag code store request is issued).

Figure 5:
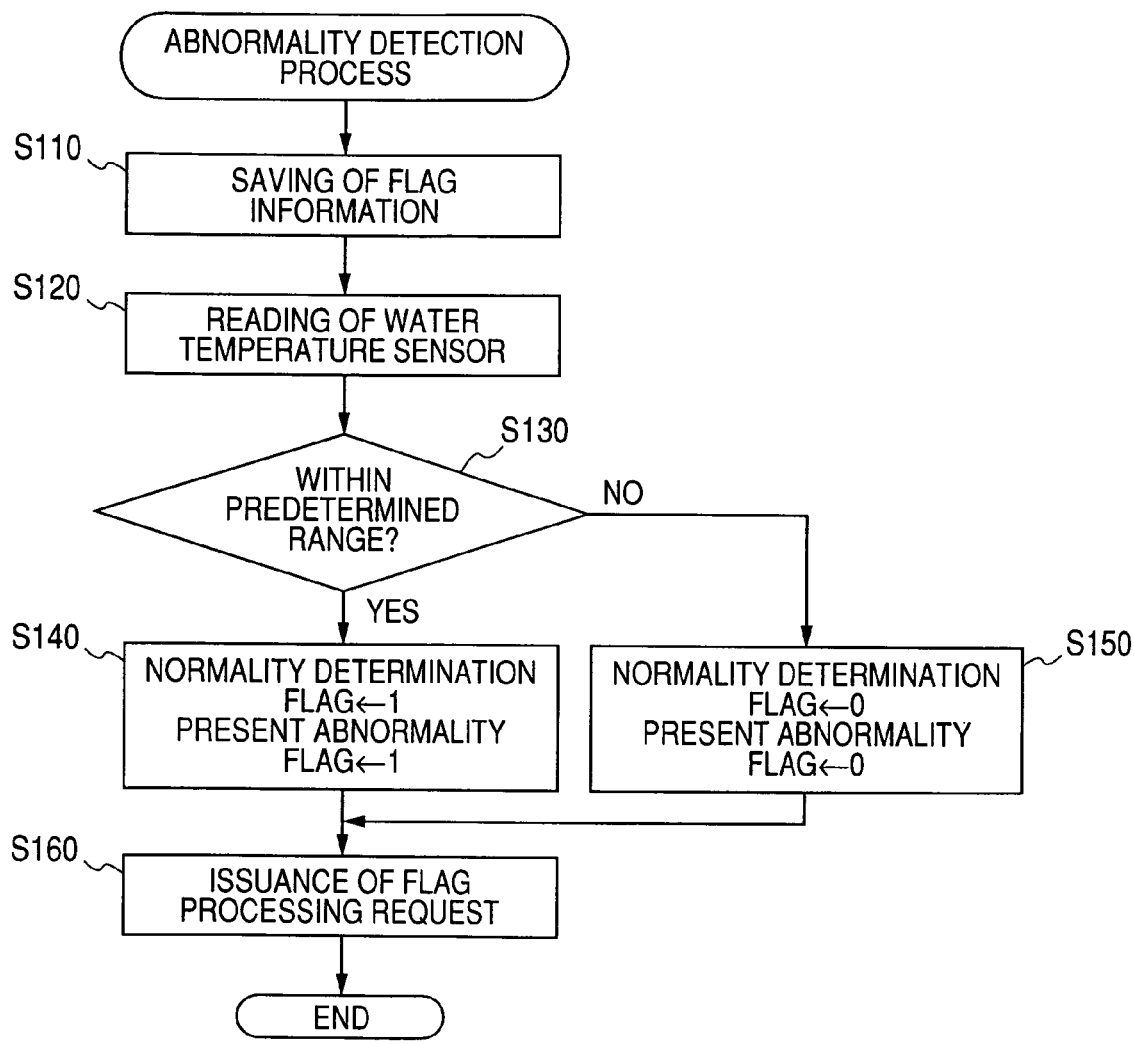
FIG. 5 is a flowchart showing a process performed by a program stored in the abnormality detection program section.

In the abnormality detection program section 114, there is stored a program performed to implement an abnormality detection process shown in FIG. 5. The process shown in FIG. 5 begins by the microcomputer 10 (the CPU 11 to be exact) saving, at step S110, the flag information of the flag storage section 112 on a not shown register as past flag information.

Next, at step S120, a detection value by the water temperature sensor is read. And then, it is determined whether or not the read detection value is within a predetermined range at step S130. If the determination result at step S130 is affirmative, the detection process proceeds to step S140 where the normality determination flag is set to "1", and the present abnormality flag is set to "0".

On the other hand, if the determination result at step S130 is negative, the detection process proceeds to step S150 where the normality determination flag is set to "0", and the present abnormality flag is set to "1". After completion of step S140 or step S150, the detection process proceeds to step S160 to issue the flag processing request to the abnormality confirmation object 200.

The abnormality confirmation object 200 determines whether or not the abnormality determination may be confirmed in view of the present driving state of the vehicle. For example, in the case of the water temperature sensor, if the voltage of the battery 3 is substantially lowered, it may occur that the detection value by the water temperature sensor is determined to be out of the predetermined range, and the water temperature sensor is determined to be abnormal even though the water temperature sensor is actually normal. In such a case, the abnormality determination is cancelled by the abnormality confirmation object 200, and the present abnormality flag is reset. On the other hand, if there is no reason to cancel the abnormality determination, the abnormality determination is confirmed by the abnormality confirmation object 200.

Returning to FIG. 4, in the abnormality information table 116, there is stored information related to each of the diag items, such as code information (diag code) to be outputted to the diagnostic tool 6, information indicative of whether one of the lamps should be lit, and information indicative of which one of the lamps should be lit.

Figure 6:
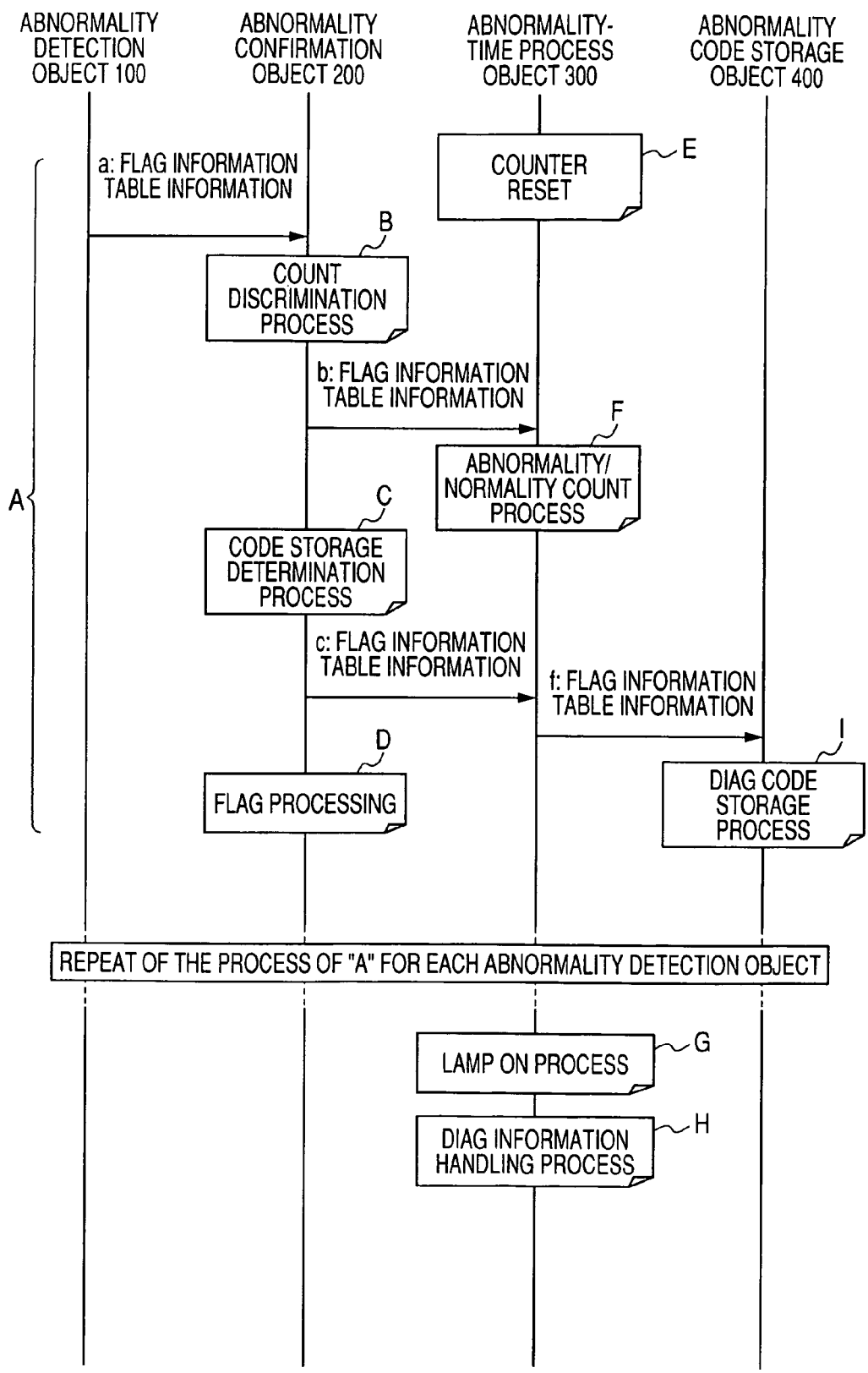
FIG. 6 is a message sequence chart showing a flow of a lamp lighting process implemented by the abnormality diagnosis program.

FIG. 6 is a message sequence chart (referred to as MCS hereinafter) which is implemented by the abnormality diagnosis program Pr, and shows particularly a flow of a lamp lighting process. This sequence is repeatedly performed at regular time intervals, for example, every 65 ms, in one trip period. Here, the trip period means a driving cycle of the vehicle (for example, a period between an on-timing of an ignition switch and a next on-timing of the ignition switch).

In the MCS shown in FIG. 6, there are shown processes actually performed by each object. And, a function call (message) from one object to another object is shown by an arrow. In FIG. 6, the microcomputer 10 (the CPU 11 to be exact) performs counter reset at step E. Here, the abnormality number counter 15, the normality number counter 16, and a not shown counter used to determine on/off of the lamps are reset.

At step B, a count discrimination process is performed on the basis of the flag processing request issued from the abnormality detection object 100. This request is shown by "a" in FIG. 6. In each message, the flag information in the flag storage section 112 and the table information in the abnormality information table 116 are exchanged. In the count discrimination process, it is determined whether or not the lamp on flag (FIG. 4) is "1". If it is determined to be "1", the count discrimination process issues the count processing request to the abnormal-time process object 300 (*b*). On the other hand, if it is determined not to be "1", this count discrimination process is terminated.

At step F, an abnormality/normality count process is performed. In this abnormality/normality count process, the abnormality number counter 15 is incremented, if it is determined, on the basis of the flag information from the abnormality confirmation object 200, that the abnormality determination has been confirmed. When the abnormality number counter 15 is incremented, subsequently, it is determined whether or not the abnormality has recovered to normality. More specifically, it is determined whether or not the present abnormality flag is "0", and the normality determination flag is "1". If this determination result is affirmative, the normality number counter 16 is incremented, and otherwise, this process is terminated.

At step C, it is determined whether or not the flag state in the flag storage section 112 has been changed. If this determination result is affirmative, since it means that the diag code should be stored, the diag code store request is issued to the abnormality code storage object 400 (*c*, *f*). On the other hand, if this determination result is negative, this process is terminated.

At step I, a process to store the diag code is performed. In this process, the diag code corresponding to the abnormality detection object 100, that is, the diag code corresponding to the diag item is stored in the SRAM 14.

At step D, a flag processing is performed. For example, a certain flag is reset. This completes a series of the processes for one diag item, and the same processes are performed repeatedly for other diag items (for each abnormality detection object). When the processes have been performed for all of the diag items, it is determined at step G whether or not the lamp should be lit or not on the basis of the lamp on flag. If this determination result is affirmative, the lamp on request is issued to light the lamp.

As explained above, in this embodiment, since a code containing information about the abnormality code (diag code) and the identification information (diag-identifiable information) is stored in the nonvolatile memory (EEPROM 50), the memory resources of the EEPROM 50 can be saved.

The above described processes are described in the aforementioned Japanese Patent No. 3659017 in further detail. Refer to this patent for further details. In this embodiment, at step H, a diag information handling process is additionally performed.

Figure 7:
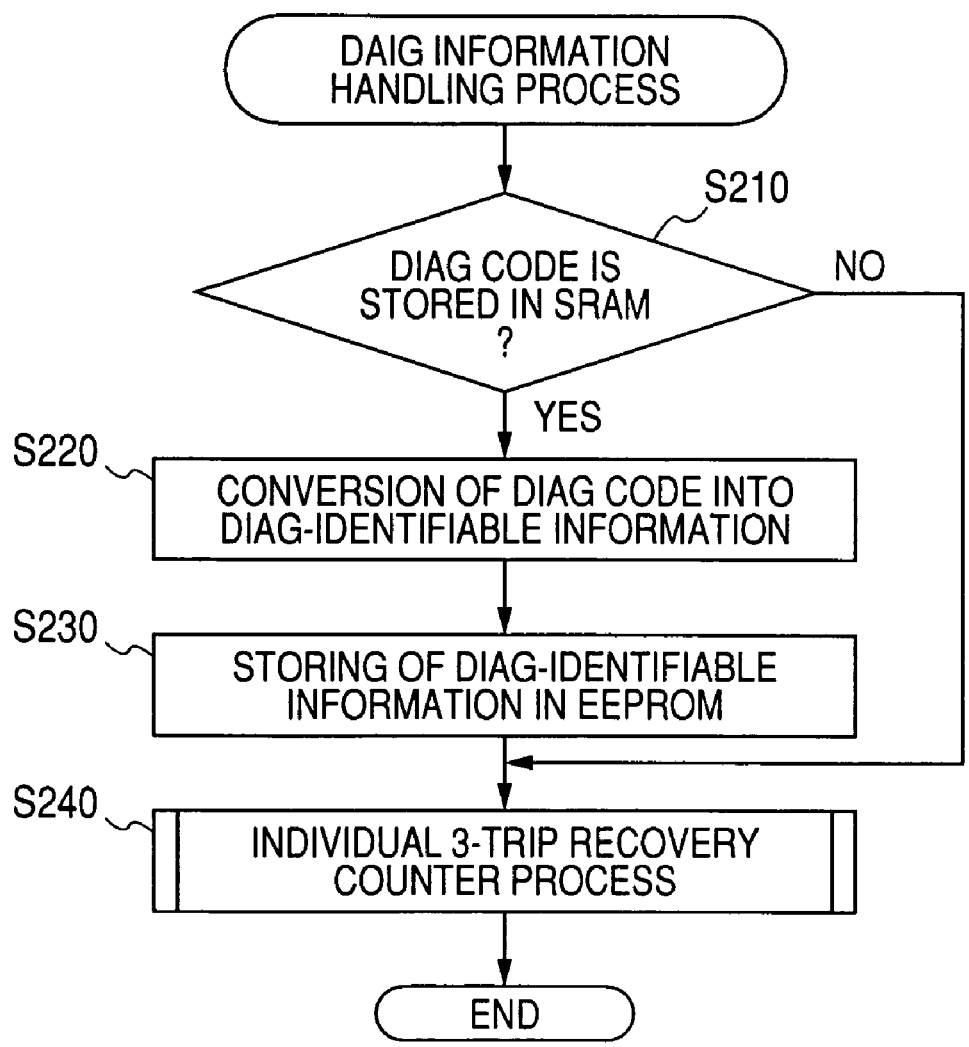
FIG. 7 is a flowchart showing a diag information handling process implemented by the abnormality diagnosis program.

FIG. 7 is a flowchart showing a flow of the diag information handling process.

The diag information handling process begins by the microcomputer 10 (the CPU 11 to be exact) determining, at step S210, whether or not a diag code is stored in the SRAM 14. If this determination result is negative, the process proceeds to step S240.

On the other hand, if this determination result is affirmative, the process proceeds to step S220. At step S220, the diag code stored in the SRAM 14 is converted into diag-identifiable information by use of the code conversion table Ta shown in FIG. 2. The details of this conversion are as described in the foregoing. In this conversion, it is possible to determine which of the diag items is abnormal on the basis of the information (the present abnormality flag, and the lamp on flag) received from the flag storage section 112 of the abnormality detection object 100 (110, 120, 130, . . . ). This determination can be made also by the addresses of the diag codes in the SRAM 14.

Thereafter, the process proceeds to step S230 where the diag-identifiable information is stored in the EEPROM 50. At subsequent step S240, an individual 3-trip recovery counter process is performed.

The individual 3-trip recovery counter 18 is provided in each of the storage areas (n) of the EEPROM 50. And the individual 3-trip recovery counter 18 is set (or up-counted) to 3 when an abnormality is detected for each of the storage areas (n), that is, for each of the diag items, and is down-counted by 1 each time the abnormality is determined to recover to normality. Here, the count operation is performed once in one trip period. That is, the individual 3-trip recovery counter 18 may be set to 3, and down-counted by 1 in one trip period.

In the following explanation, the individual 3-trip recovery counter 18 for the storage area (n) is referred to as the individual 3-trip recovery counter (n). For example, the individual 3-trip recovery counter 18 for the storage area (0) is referred to as the individual 3-trip recovery counter (0).

Figure 8:
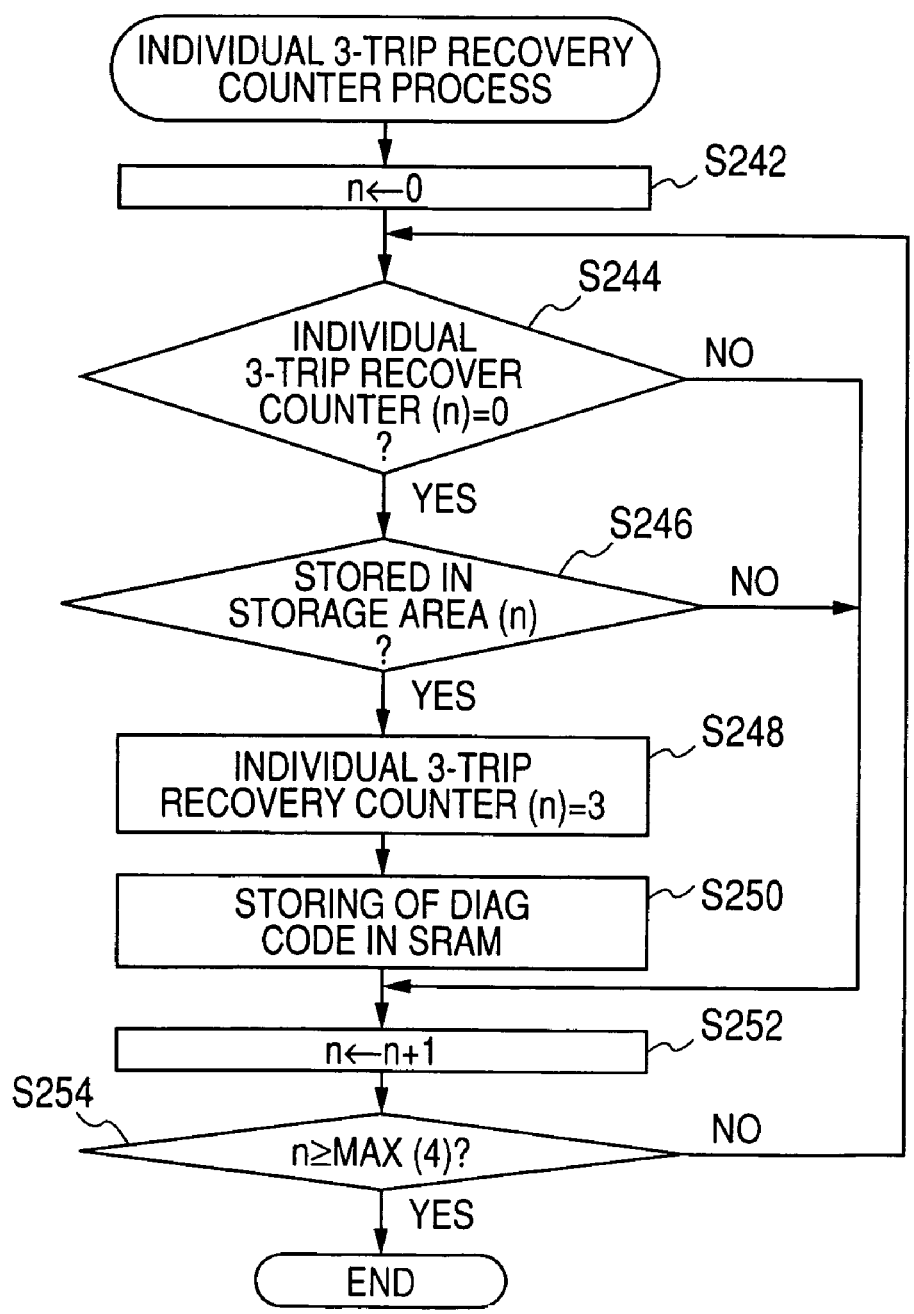
FIG. 8 is a flowchart showing an individual 3-trip return counter process included in the diag information handling process.

FIG. 8 is a flowchart showing a flow of the individual 3-trip recovery counter process. This process begins by setting n to 0 for the storage area (n). By this, the individual 3-trip recovery counter (0) is set as a processing object.

At subsequent step S244, it is determined whether or not the value of the individual 3-trip recovery counter (0) is 0. If this determination result is negative, the process proceeds to step S252. On the other hand, if this determination result is affirmative, the process proceeds to step S246 where it is determined whether or not the diag-identifiable information is stored in the storage area (0).

If the determination result at step S246 is negative, the process proceeds to step S252. On the other hand, if the determination result at step S246 is affirmative, the process proceeds to step S248 where the individual 3-trip recovery counter (0) is set to 3. Thereafter, the process proceeds to step S250 where the diag code is extracted from the diag-identifiable information by use of the code conversion table Ta, and the extracted diag code is stored in the SRAM 14.

Thereafter, the process proceeds to step S252 where the "n" is replaced by "n+1", and the "n+1" is set as new "n". At subsequent step S254, it is determined whether or not the new "n" is equal to or larger than 4. If this determination result is negative, the process returns to step S244. On the other hand, if this determination result is affirmative, the process is terminated. That is, for each storage area (n), n being 0, 1, 2, 3, ..., the above process (S244 to S254) is performed.

Figure 9:
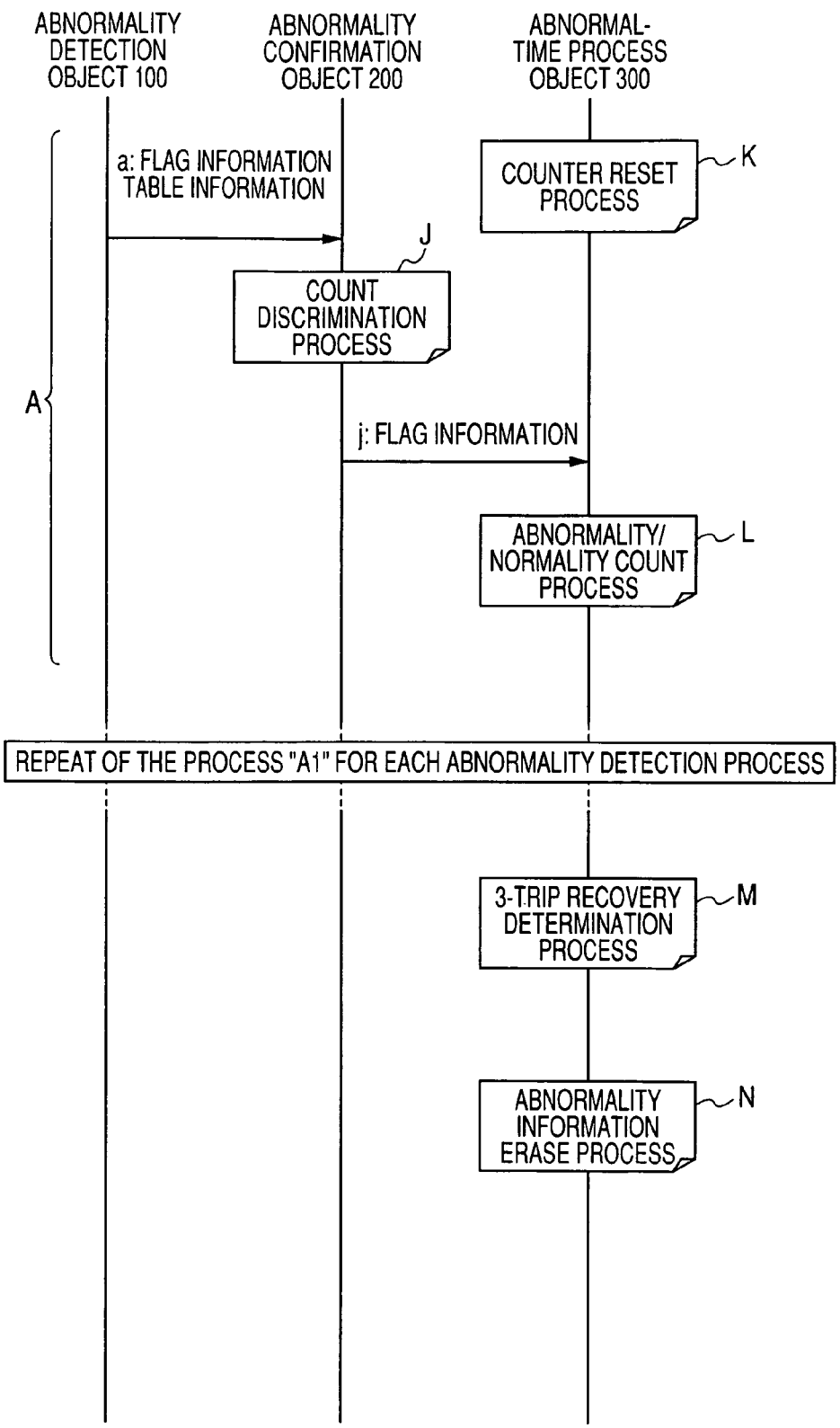
FIG. 9 is a message sequence chart showing a flow of processes performed at the initial time of a trip period (driving cycle) of a vehicle.

FIG. 9 is a message sequence chart (MSC) showing a flow of processes performed only once at the initial time of the trip period, that is, at the start of the driving cycle of the vehicle.

Figure 10:
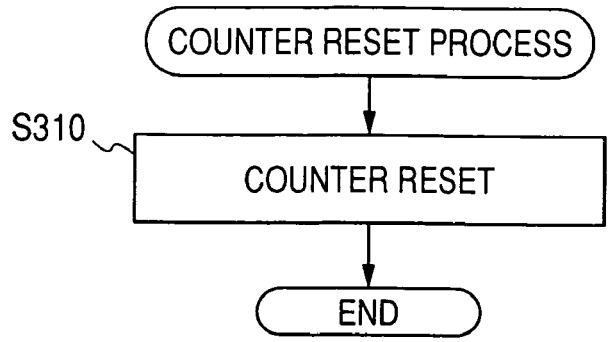
FIG. 10 is a flowchart showing a flow of a counter reset process performed by the microcomputer.

As shown in FIG. 9, the microcomputer 10 (the CPU 11 to be exact) performs a counter reset process at step K. FIG. 10 is a flowchart showing a flow of the counter reset process.

This counter reset process begins by resetting the abnormality number counter 15 and the normality number counter 16 at step S310, and then this process is terminated. Returning back to FIG. 9, the microcomputer 10 performs a count discrimination process at step J in response to the flag processing request (a1) issued from the abnormality detection object 100. The content of this count discrimination process is the same as that of the count discrimination process shown in FIG. 6.

Figure 11:
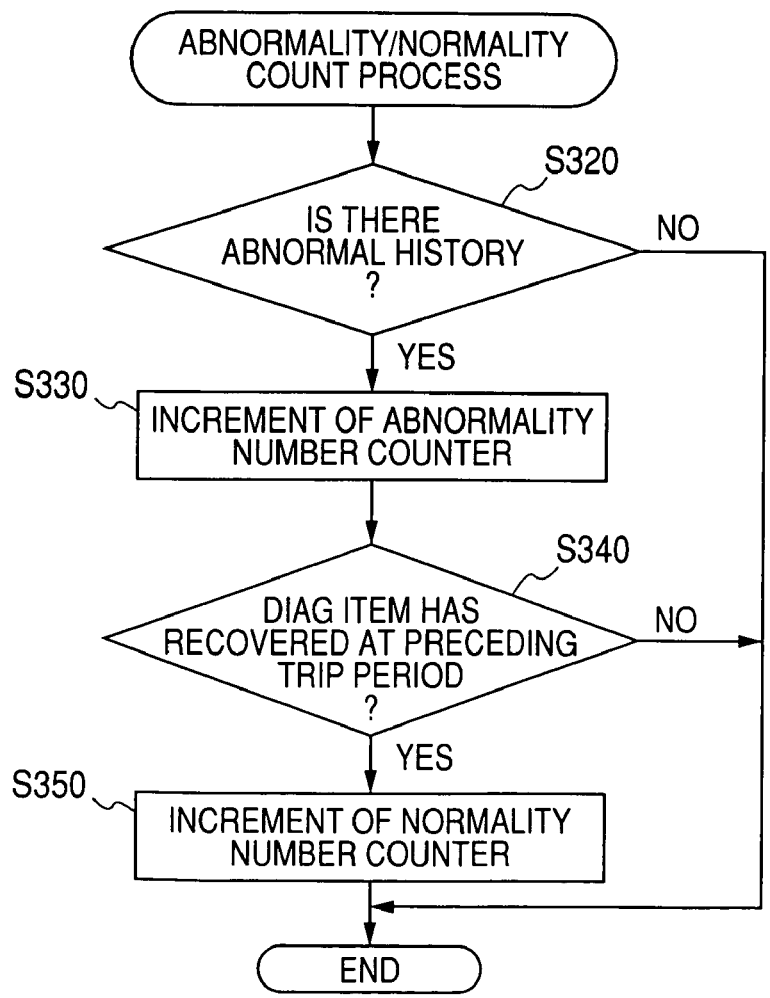
FIG. 11 is a flowchart showing a flow of an abnormality/normality count process performed by the microcomputer.

Next, the microcomputer 10 performs an abnormality/normality count process at step L in response to the count processing request (j) issued form the abnormality confirmation object 200. FIG. 11 is a flowchart showing a flow of the abnormality/normality count process.

This abnormality/normality count process begins by determining at step S320 whether or not there is an abnormality history on the basis of a not shown abnormality history flag. The abnormality history flag is such as to be put in a set state during a period from when abnormality is detected until the abnormality is recovered.

If the determination result at step S320 is negative, this process is terminated. On the other hand, if the determination result at step S320 is affirmative, this process proceeds to step S330 where the abnormality number counter 15 is incremented.

Next, at step S340, it is determined whether or not the diag item with the abnormality history has been determined to recover to normality at the preceding trip period on the basis of a not shown normality history flag. The normality history flag is such as to be set if the diag item is determined to be normal.

If the determination result at step S340 is negative, this process is terminated. On the other hand, if the determination result at step S340 is affirmative, this process proceeds to step S350 where the normality number counter 16 is incremented. Thereafter, this process is terminated.

Returning back to FIG. 9, such processes (steps K, J, L) are repeated for each diag item. Next, at step M, a 3-trip recovery determination process is performed.

Figure 12:
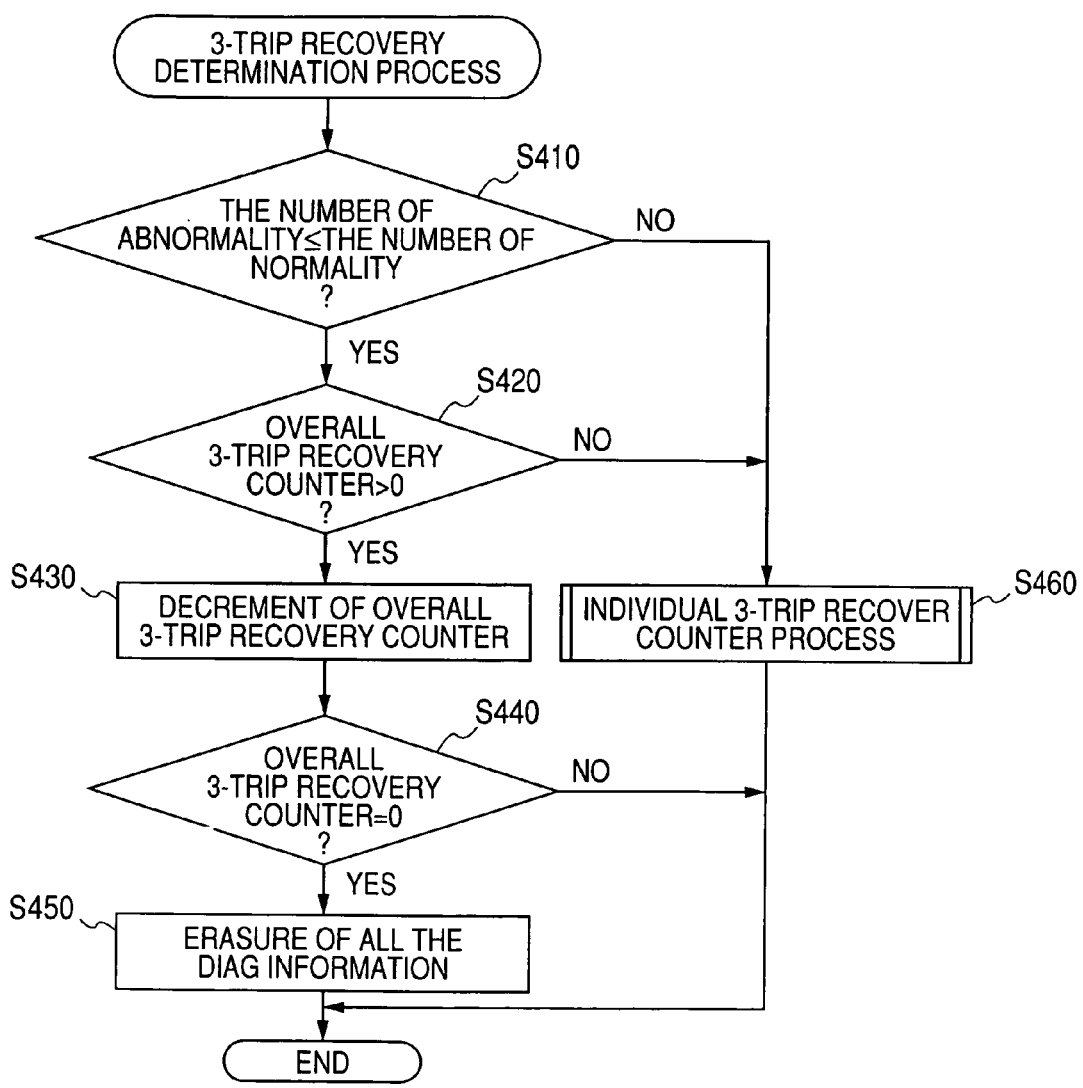
FIG. 12 is a flowchart showing a flow of a 3-trip recovery determination process performed by the microcomputer.

And, at step N, an abnormality information erase process is performed. This abnormality information erase process corresponds to after-described steps S450, S468. FIG. 12 is a flowchart showing a flow of the 3-trip recovery determination process.

The 3-trip recovery determination process begins by determining whether or not the number of abnormalities≦the number of normalities on the basis of the values of the abnormality number counter 15 and the normality number counter 16. If this determination result is affirmative, this process proceeds to step S420.

At step S420, it is determined whether or not the value of the overall 3-trip recovery counter 17 is larger than 0. If this determination result is affirmative, the process proceeds to step S430 where the overall 3-trip recovery counter 17 is decremented.

Thereafter, at step S440, it is determined whether or not the value of the overall 3-trip recovery counter 17 is 0. If this determination result is affirmative, the process proceeds to step S450 where all the diag-identifiable information stored in the EEPROM 50 is erased. Thereafter, the process is terminated. Incidentally, the regulation allows to erase the information stored in the EEPROM 50 (diag-identifiable information in this embodiment), if determination of recovery from abnormality (the determination of the number of abnormalities≦the number of normalities) has been made three consecutive times (for three consecutive trip periods). On the other hand, if the determination result at step S440 is negative, the process is terminated.

If the determination result at step S410 is negative, and the determination result at step S420 is negative, the process proceeds to step S460.

At step S460, the individual 3-trip recovery counter process is performed. If the power supply from the battery 3 is disconnected, all the information stored in the SRAM 14 is erased, and the overall 3-trip recovery counter 17 is reset. In such a case, the individual 3-trip recovery counter process is performed, as a consequence of which, the diag codes are stored again in the SRAM 14 by use of the information held in the EEPROM 50.

Figure 13:
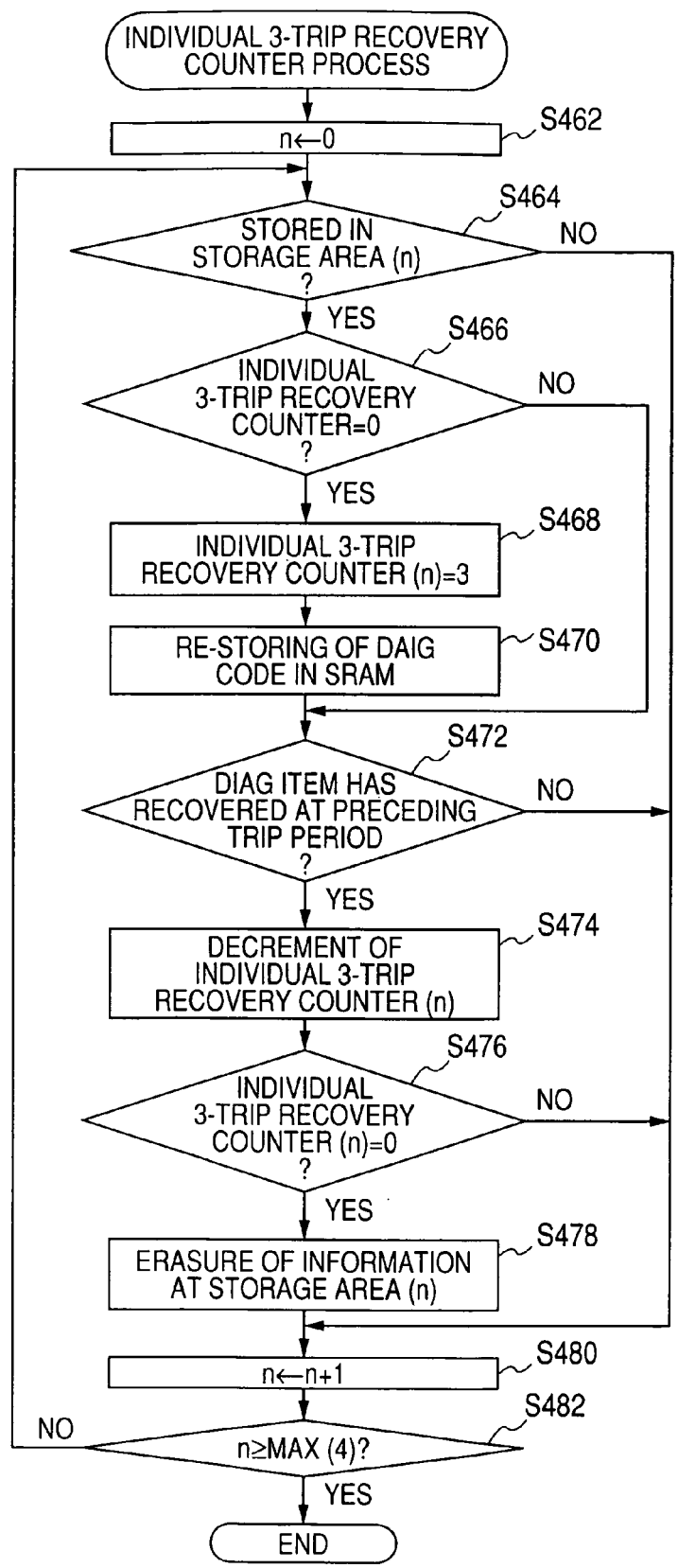
FIG. 13 is a flowchart showing a flow of an individual 3-trip recovery counter process performed by the microcomputer.

FIG. 13 is a flowchart showing a flow of the individual 3-trip recovery counter process. This process begins by setting n to 0 at step S462. By this, the individual 3-trip recovery counter (0) is set as a processing object.

Next, at step S464, it is determined whether or not diag-identifiable information is stored in the storage area (0). If this determination result is negative, the process proceeds to step S480. On the other hand, if this determination result is affirmative, the process proceeds to step S466.

At step S466, it is determined whether or not the value of the individual 3-trip recovery counter (0) is 0. If this determination result is negative, the process proceeds to step S472. On the other hand, if this determination result is affirmative, the process proceeds to step S468 where the individual 3-trip recovery counter (0) is set to 3.

Subsequently, at step S470, the diag code is extracted from the diag-identifiable information stored in the storage area (0) by use of the code conversion table Ta shown in FIG. 2, and the extracted diag code is stored in the SRAM 14.

Next, at step S472, it is determined whether or not the diag item indicated to be abnormal by the diag-identifiable information stored in the storage area (0) has been determined to recover to normality at the preceding trip period. If this determination result is negative, the process proceeds to step S480. On the other hand, if this determination result is affirmative, the process proceeds to step S474 where the individual 3-trip recovery counter (0) is decremented by 1.

Next, at step S476, it is determined whether or not the value of the individual 3-trip recovery counter (0) is 0. If this determination result is negative, the process proceeds to step S480. On the other hand, if this determination result is affirmative, the process proceeds to step S478 where the diag-identifiable information stored in the storage area (0) is erased. This erasure is allowed by the regulation as described in the foregoing.

Thereafter, the process proceeds to step S480 where the "n" is replaced by "n+1", and the "n+1" is set as new "n". At subsequent step S482, it is determined whether or not the new "n" is equal to or larger than 4. If this determination result is negative, the process returns to step S464. On the other hand, if this determination result is affirmative, the process is terminated. That is, for each storage area (n) n being 0, 1, 2, 3, . . . , the above process (S464 to S482) is performed. Next, the operation of this embodiment is explained below with reference to FIG. 14 and FIG. 15.

Figure 14:
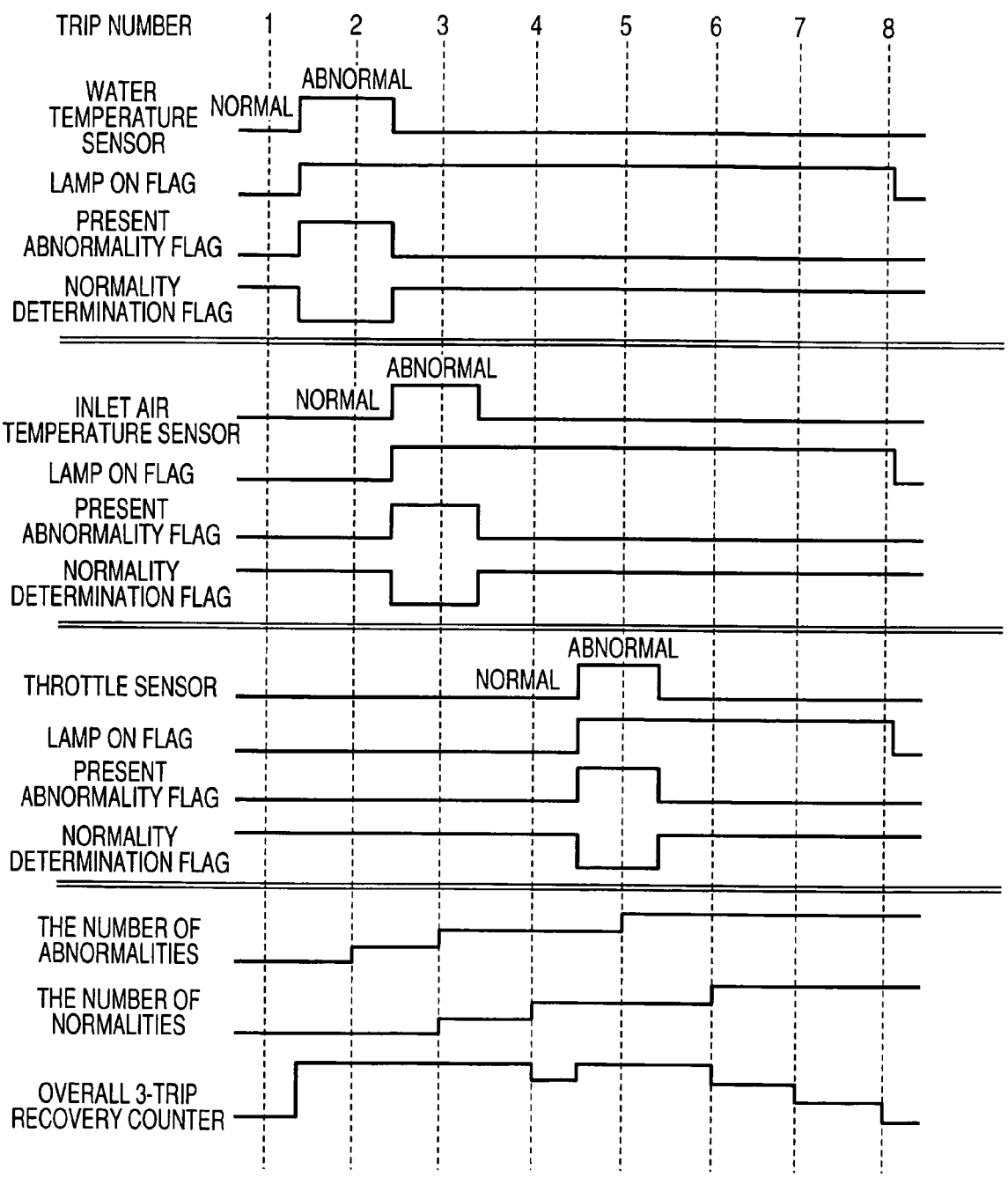
FIG. 14 is a time chart for explaining the operation of an overall 3-trip recovery counter included in the engine ECU.

FIG. 14 is a time chart for explaining the operation of the overall 3-trip recovery counter 17. In FIG. 14, each of the periods sectioned by the numerals shown at the top portion of this Figure, indicates one trip period. For example, the earliest trip period is defined as between the numeral 1 and the numeral 2.

In FIG. 14, abnormality/normality is indicated for the three diag items of the temperature sensor, inlet air temperature, and throttle sensor. In the bottom portion of FIG. 14, there are shown the count values of the number of abnormalities (the count value of the abnormality number counter 15), the number of normalities (the count value of the normality number counter 16), and the count value of the overall 3-trip recovery counter 17.

The time chart of FIG. 14 shows a case in which in the first trip period, an abnormality is detected in the water temperature sensor, in the second trip period, the water temperature sensor recovers, and an abnormality is detected in the inlet air sensor, in the third trip period, the inlet air sensor recovers, in the fourth trip period, an abnormality is detected in the throttle sensor, and in the fifth trip period, the throttle sensor recovers.

The following is an explanation of the overall 3-trip recovery counter 17 in such a case. In the first trip period, the present abnormality flag and the normality determination flag related to the water temperature sensor become 1 and 0 (S150 in FIG. 5), respectively, and the lamp on flag becomes 1 (confirmation of abnormality). At this time, since an abnormality has been detected, the overall 3-trip recovery counter 17 is set to 3.

At the initial time of the second trip period, due to the abnormality in the water temperature sensor, the number of abnormalities increases by 1 as a result of performing the abnormality/normality count process (S330). The number of normalities is kept the same (S340: NO). In this case, since the number of abnormalities (1)>the number of normalities (0), a negative determination is made at step S410, and the process proceeds to step S460.

At the initial time of the third trip period, due to the abnormality in the inlet air temperature sensor, the number of abnormalities increases by 1 (S330). Since the water temperature sensor has recovered in the preceding second trip period (S340: YES), the number of normalities increases by 1 (S350). In this case, it results that the number of abnormalities (2)>the number of normalities (0). Accordingly, a negative determination is made at step S410, and the process proceeds to step S460.

At the initial time of the fourth trip period, the number of abnormalities is kept the same. And, since the inlet air temperature sensor has recovered in the preceding third trip period (S340: YES), the number of normalities increases by 1 (S350). In this case, it results that the number of abnormalities (2)=the number of normalities (2). Thus, since an affirmative determination is made at step S420, and at step S430, the overall 3-trip recovery counter 17 is decremented, and as a result, the value of the overall 3-trip recovery counter 17 becomes 2.

Further, since an abnormality has been detected in the throttle sensor in the fourth trip period, the overall 3-trip recovery counter 17 is set to 3 again. At the initial time of the fifth trip period, due to the abnormality in the throttle sensor, the number of abnormalities increases by 1 (S330), while the number of normalities is kept the same. In this case, it results that the number of abnormalities (3)>the number of normalities (2).

At the initial time of the sixth trip period, the number of abnormalities is kept the same, and the number of normalities increases by 1 (S350) because the throttle sensor has recovered in the preceding fifth trip period (S340: YES). In this case, it results that the number of abnormalities (3)=the number of normalities (3), and the overall 3-trip recovery counter 17 is decremented (S430).

Thereafter, at the initial time of each trip period, the number of abnormalities becomes equal to the number of normalities, and the value of the overall 3-trip recovery counter 17 decreases by 1. In this example, the value of the overall 3-trip recovery counter 17 becomes 0 at the initial time of the eighth trip period (S440: YES). And then, all the diag-identifiable information stored in the EEPROM 50 is erased (S450).

The above is an example of the operation of the overall 3-trip recovery counter 17. According to the individual 3-trip recovery counter 18 of this embodiment, it is also possible to erase the diag-identifiable information stored in the EEPROM 50 on an individual basis as explained below.

Figure 15:
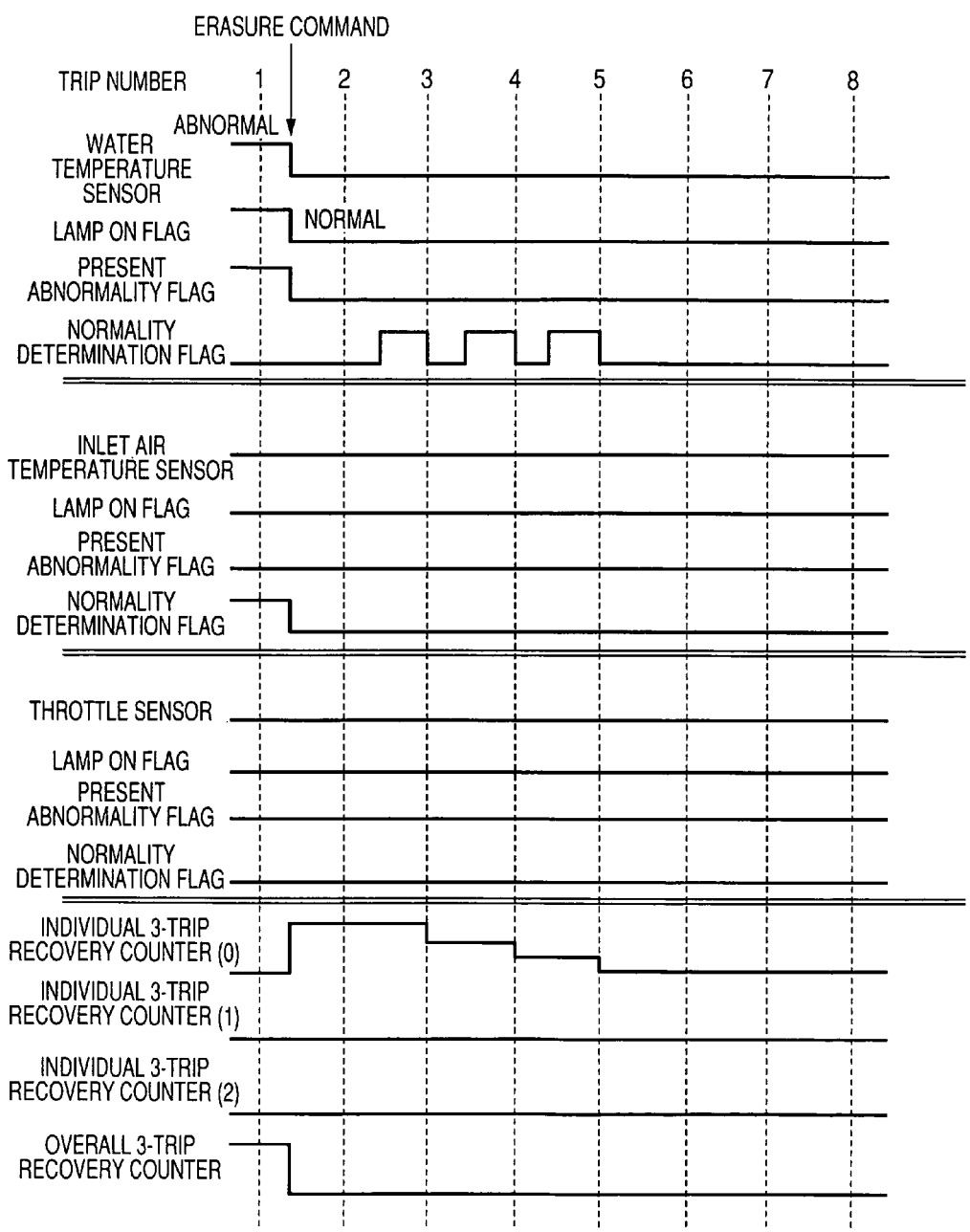
FIG. 15 is a time chart for explaining the operation of an individual 3-trip recovery counter included in the engine ECU.

FIG. 15 is a flowchart for explaining the operation of the individual 3-trip recovery counter 18.

In the bottom portion of FIG. 15, there are shown three individual 3-trip recovery counters (n), n being 1, 2, or 3, along with the overall 3-trip recovery counter 17. Here, the individual 3-trip recovery counter (0) is associated with the water temperature sensor, the individual 3-trip recovery counter (1) is associated with the inlet air temperature, and the individual 3-trip recovery counter (2) is associated with the throttle sensor.

FIG. 15 shows a case in which an abnormality is detected in the water temperature sensor in a trip period preceding the first trip period. Accordingly, at the initial time of the first trip period, the present abnormality flag is 1, the normality determination flag is 0, the lamp on flag is 1, and the value of the overall 3-trip recovery counter 17 is 3. In this case, it is assumed that the water temperature sensor is determined to recover to normality in each of the second, third, and fourth trip periods, and an erase command to erase the diag code is inputted into the engine ECU 4 from the diagnostic tool 6 shown in FIG. 1.

In such a case, when the abnormality in the water temperature sensor is detected, the diag code indicative of the water temperature sensor being abnormal is stored in the SRAM 14 at step I shown in FIG. 6. In addition, the diag-identifiable information indicative of the water temperature sensor being abnormal is stored in the EEPROM 50 at step H (S230 in particular).

When the erase command is inputted into the engine ECU 4 from the diagnostic tool 6, the diag code stored in the SRAM 14 is erased, and the lamp on flag and the present abnormality flag are reset. And also the overall 3-trip recovery counter 17 is reset. Incidentally, erasing a certain diag code, or resetting a certain flag in accordance with the erase command from a diagnostic tool is just a process performed in conventional apparatuses.

However, in this embodiment, since the diag-identifiable information is stored in the storage area (n) of the EEPROM 50, it is possible to extract the diag code from this diag-identifiable information, and store this diag code in the SRAM 14 again (S464 to S470). That is, since the EEPROM 50 serves as a backup of the SRAM 14, it becomes possible to protect against a situation where the diag codes stored in the SRAM 14 have been unintentionally or improperly erased.

On the other hand, according to the individual 3-trip recovery counter 18, it is possible to erase the diag-identifiable information on an individual basis as explained below. In the first trip period, it is determined, first, that the value of the individual 3-trip recovery counter (0) is 0 (S244: YES), and then it is determined that the diag-identifiable information is stored in the storage area (0) of the EEPROM 50 (S246: YES).

Subsequently, the individual 3-trip recovery counter (0) is set to 3 (S248), and the diag code extracted from the diag-identifiable information is stored in the SRAM 14 (S250).

Since the value of the overall 3-trip recovery counter 17 is 0 at the initial time of the third trip period (S420: NO), the process proceeds to step S460 to perform the 3-trip recovery counter process. In this process, it is determined that the determination of recovery to normality has been made in the preceding trip period (the second trip period), and the value of the individual 3-trip recovery counter (0) is decremented by 1 (S474). In a similar way, at the initial time of each of the fourth and fifth trip periods, the value of the individual 3-trip recovery counter (0) is decremented by 1 (S474). And accordingly, in the fifth trip period, the value of the individual 3-trip recovery counter (0) becomes 0. As a result, the diag-identifiable information stored in the storage area (0) is erased (S478).

This erasure is in conformity with the aforementioned regulation.

As explained above, in this embodiment, the EEPROM 50 serving as a backup of the SRAM 14 is provided to conform to the regulation, and this EEPROM 50 is configured to store therein the diag-identifiable information enabling to identify each diag code (diag item). This makes it possible to erase, from the EEPROM 50, only the desired diag-identifiable information associated with the diag item that has been recovered to normality on an individual basis.

Here, assume a case where, unlike the present embodiment, the diag codes are stored only in the EEPROM 50. In this assumed case, given that a diag item A and a diag item B shares the same diag code, abnormalities are detected in these diag items A, B, and thereafter, only the diag item A recovers to normality, it may become impossible to determine whether one of the diag codes stored in the EEPROM 50, which is assigned to the diag item A, can be erased or not. Because this diag code is also assigned to the diag item B. In addition, the diag code assigned to the diag item B (and also to the diag item A) may be erased even though the diag item B has not recovered to normality. In the former, it is not possible to make efficient use of the storage areas of the EEPROM 50. And the latter is against the regulation.

Unlike the above case, according to the present embodiment, since a diag code assigned to a certain diag item is converted into diag-identifiable information specific to this diag item, and this diag-identifiable information is stored in the EEPROM 50, it is possible to erase diag-identifiable information corresponding to a desired diag item on an individual basis. This makes it possible to make efficient use of the storage areas of the EEPROM 50 without violating the regulation.

Variant of the Present Embodiment

Next, explanation is made as to a variant of the present embodiment, which is configured to perform reprogramming.

Here, "reprogramming" means that the engine ECU 4 communicates with a reprogramming tool (which may be the diagnostic tool 6, or a not shown rewriting tool) in order to perform program rewriting. In the following explanation, it is assumed that the reprogramming tool is the diagnostic tool 6. And, in the following explanation, the term "pre-process" means a process which the microcomputer 10 of the engine ECU 4 performs before reprogramming, and the term "post-process" means a process which the microcomputer 10 of the engine ECU 4 performs after reprogramming.

Figure 16A:
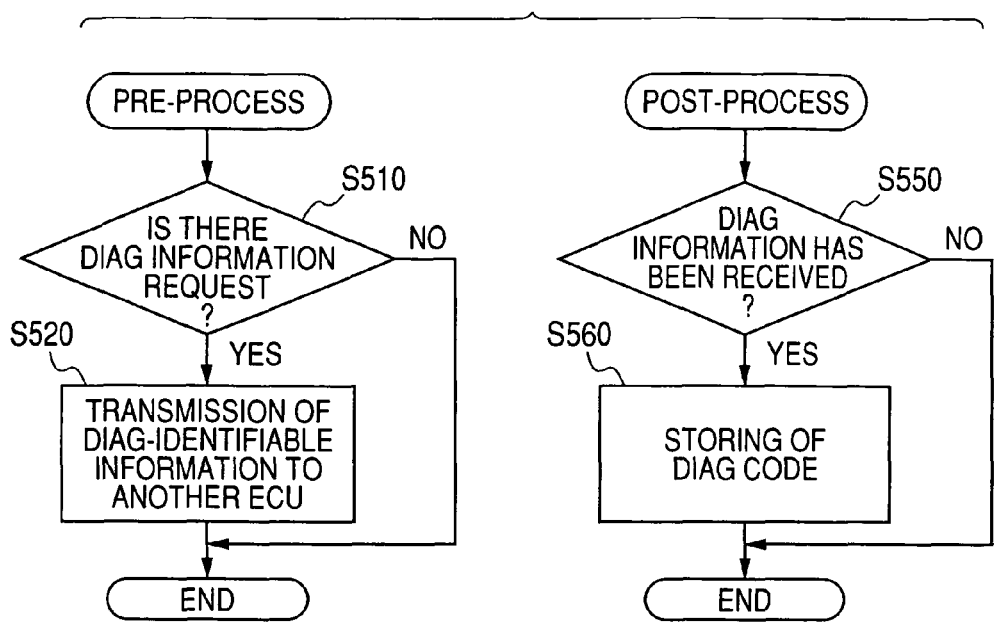
FIGS. 16A and 16B are diagrams for explaining the operation of a variant of the embodiment of the invention.
Figure 16B:
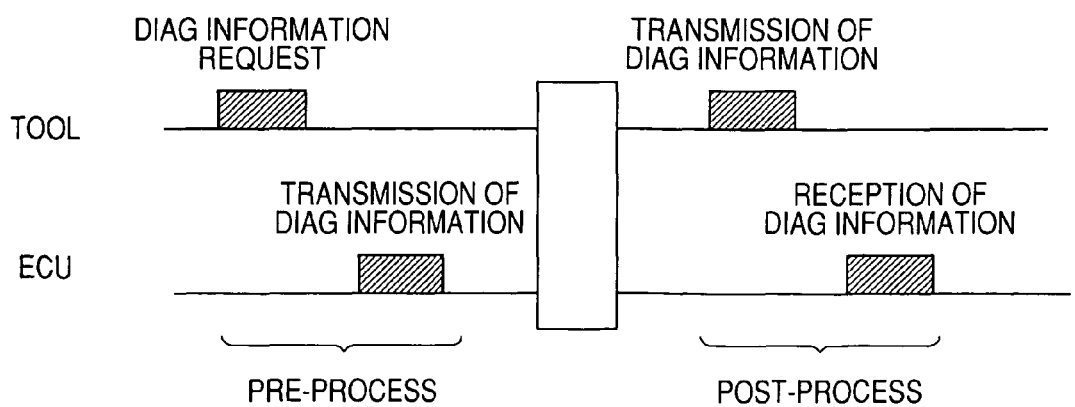

FIG. 16A shows flowcharts showing flows of the pre-process, and the post-process. FIG. 16B is a diagram schematically showing a relationship among the pre-process, reprogramming, and the post-process. As shown in FIG. 16A, the pre-process begins by determining at step S510 whether or not a request command to request a diag code has been received from the diagnostic tool 6. If this determination result is negative, this process is terminated.

On the other hand, if this determination result is affirmative, the process proceeds to step S520. At step S520, when the diag code is stored in the SRAM 14, it is outputted to the diagnostic tool 6. While on the other hand, when the diag code has been erased from the SRAM 14, the diag code is extracted from diag-identifiable information stored in the EEPROM 50, and this extracted diag code is outputted to the diagnostic tool 6, while outputting the diag-identifiable information stored in the EEPROM 50 to another ECU (to the transmission ECU 5, for example). The transmission ECU 5 as another ECU stores the diag-identifiable information received from the engine ECU 4 in an EEPROM thereof. Thereafter, the process is terminated.

When the reprogramming is performed, the EEPROM 50 of the engine ECU 4, and the SRAM 14 of the microcomputer 10 are cleared. In the post-process, it is determined first at step S550 that the diag-identifiable information transmitted to another ECU at step S520 has been received from the another ECU. If this determination result is negative, the process is terminated. In this post-process, the microcomputer 10 may issue a reply request to the another ECU.

On the other hand, if the determination result at step S550 is affirmative, the process proceeds to step S560.

At step S560, the diag code is extracted from the diag-identifiable information received from the another ECU and stored in the EEPROM 50 of the engine ECU 4, and this extracted diag code is stored in the SRAM 14 again. The destination of the diag-identifiable information transmitted at step S520 may be the diagnostic tool 6 as explained below.

In this case, when the diagnostic tool 6 issues the request command to the engine ECU (S510: YES), the engine ECU 4 transmits the diag-identifiable information to the diagnostic tool 6 (S520).

After the reprogramming is performed, the diagnostic tool 6 returns the diag-identifiable information to the engine ECU 4. The engine ECU 4 receives the diag-identifiable information from the diagnostic tool 6 (S550: YES), stores the received diag-identifiable information in the EEPROM 50, and stores the diag code indicated by the received diag-identifiable information in the SRAM 14 (S560).

It is a matter of course that various modifications can be made to the above described embodiment.

For example, the diag-identifiable information may be produced by causing the microcomputer 10 to perform a predetermined computational expression for converting each diag code into corresponding diag-identifiable information, instead of using the code conversion table Ta.

The EEPROM 50 as a nonvolatile memory may be provided plurally. Although the overall 3-trip recovery counter 17 and the individual 3-trip recovery counter 18 are configured to be set to 3 when an abnormality is detected, they may be configured to be set to 4 when an abnormality is detected. In this configuration, when the overall 3-trip recovery counter 17 is used, all the information stored in the EEPROM 50 may be erased when the value of the overall 3-trip recovery counter 17 becomes 0 after a determination of the number of abnormalities<=the number of normalities has been made four consecutive times. Likewise, in this configuration, when the individual 3-trip recovery counter 18 is used, the diag-identifiable information associated with an abnormal diag item stored in the EEPROM 50 may be erased when the value of the individual 3-trip recovery counter 18 becomes 0 after a determination of the number of abnormalities<=the number of normalities has been made four consecutive times for this abnormal diag item.

The above explained preferred embodiments are exemplary of the invention of the present application which is described solely by the claims appended below. It should be understood that modifications of the preferred embodiments may be made as would occur to one of skill in the art.

What is claimed is:

1. An electronic control apparatus comprising:
   a rewritable nonvolatile memory;
   a monitoring means for monitoring a first item and a second item; and
   an abnormality storing means configured (a) to store, when said monitoring means detects an abnormality in said first item, identification information identifying said first item and a diag code representing a type of said abnormality detected in said first item in said rewritable nonvolatile memory, and (b) to store, when said monitoring means detects an abnormality in said second item, identification information identifying said second item and a diag code representing a type of said abnormality detected in said second item in said rewritable nonvolatile memory so that said first item and its respectively corresponding diag code is uniquely identifiable from said second item and its respectively corresponding diag code based on data stored in said rewritable nonvolatile memory.

2. An electronic control apparatus comprising:
   a rewritable nonvolatile memory; and
   a data processor configured to effect
   (a) a first function of performing a monitoring operation to detect abnormalities in each of first to Nth items, N being an integer larger than or equal to 2; and
   (b) a second function of, when said first function detects an abnormality in an M-th item, M being an integer larger than or equal to 1 and not larger than said N, storing an abnormality diag code indicative of said abnormality in said rewritable nonvolatile memory, said abnormality diag code being assigned in common to said first to N-th items;
   wherein said second function is configured to store identification information uniquely associated with said M-th item so that said M-th item is capable of being uniquely identified from said first to N-th items in said rewritable nonvolatile memory.

3. The electronic control apparatus according to claim 2, wherein:
   said data processor is mounted on a vehicle,
   said first function is configured to perform said monitoring operation in each trip period of said vehicle, and
   said electronic control apparatus is further configured to effect a third function of, when said first function makes a determination of said M-th item having recovered to normality in a predetermined number of consecutive said trip periods, identifying said abnormality diag code indicating said M-th item and said identification information uniquely associated with said M-th item from other abnormality diag codes and identification information stored in said rewritable nonvolatile memory based on said identification information associated with said M-th item, and erasing data representing said M-th item and said identification information associated with said M-th item from said nonvolatile memory.

4. The electronic control apparatus according to claim 3, further comprising:
   a counter provided for each said first to N-th items, said counter being configured to start a count operation in a first direction when said first function detects presence of an abnormality and to start said count operation in a second direction opposite to said first direction when said first function detects absence of an abnormality, said count operation being performed once in each said trip period,
   said third function being configured to determine that said M-th item has recovered to normality if said counter provided for said M-th item has performed said count operation in said second direction for said predetermined number of consecutive said trip periods.

5. The electronic control apparatus according to claim 2, wherein said processor is further configured to effect:
   a third function of storing data representing relationships between each of said first to said N-th items and identification information to uniquely identify said each of said first to said N-th items,
   said second function being configured to derive said identification information uniquely indicating said M-th item based on said data representing relationships as previously stored by said third function, and to store said derived identification information in said rewritable nonvolatile memory together with said abnormality diag code.

6. The electronic control apparatus according to claim 5, wherein:
   said second function is configured to store a further code containing information about said abnormality diag code and said identification information associated with said M-th item in said rewritable nonvolatile memory in place of said abnormality diag code and said identification information associated with said M-th item,
   said third function being configured to also store data representing a relationship between said further code and said abnormality diag code,
   said processor being configured to effect a fourth function of restoring said abnormality diag code by referring to said data representing a relationship stored in said rewritable nonvolatile memory, and outputting a restored abnormality code in response to a request from an external diagnostic tool.

7. The electronic control apparatus according to claim 1, wherein said identification information is stored in association with each of said first to Nth items.

8. The electronic control apparatus according to claim 1, wherein two or more of said first to N-th items are assigned the same abnormality diag code, and the identification information separately associated with each of said two or more of said first to N-th items uniquely identifies each of said two or more of said first to N-th items.

9. The electronic control apparatus according to claim 3, further comprising:
a memory in which said abnormality diag code is stored, a storage address of said memory in which each abnormality diag code is stored being predetermined such that said identification information associated with each said item is a storage address thereof in said memory.

10. The electronic control apparatus according to claim 2, wherein:
said rewritable nonvolatile memory is disposed in an external device connected to said processor.

* * * * *